(No Model.)
R. M. CLOUGH.
DUPLEX GEAR CUTTER.
No. 490,638. Patented Jan. 31, 1893.
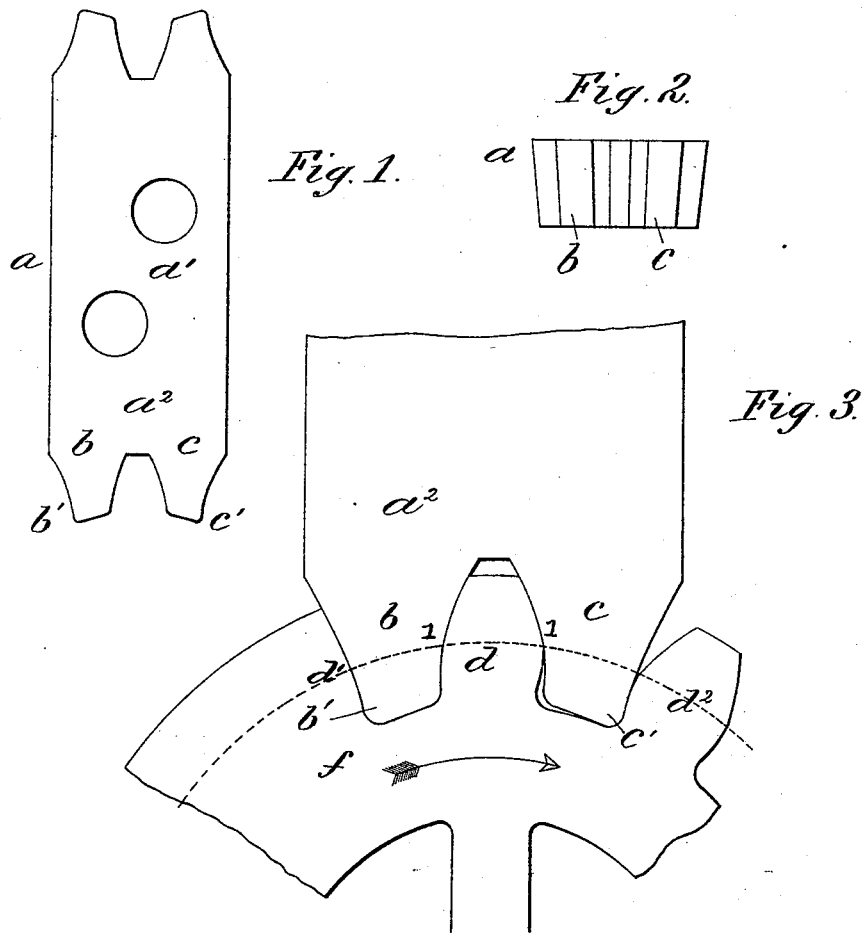
Witnesses:
Chas. B. Chandler
G. B. Jenkins
Inventor:
Roger M. Clough,
by Chas. L. Burdett
Attorney

UNITED STATES PATENT OFFICE.

ROGER M. CLOUGH, OF TOLLAND, CONNECTICUT.

DUPLEX GEAR-CUTTER.

SPECIFICATION forming part of Letters Patent No. 490,638, dated January 31, 1893.

Application filed February 27, 1892. Serial No. 423,094. (No model.)

*To all whom it may concern:*

Be it known that I, ROGER M. CLOUGH, of Tolland, in the county of Tolland and State of Connecticut, have invented certain new and useful Improvements in Duplex Gear-Cutters, of which the following is a full, clear, and exact description, whereby any one skilled in the art can make and use the same.

The object of my invention is to provide a tool for cutting gear teeth so that gear wheels may be produced of different diameters that shall be all interchangeable and capable of being run in train; the tooth being also one that is adapted to be used either on a wheel or segment of a circle or on a straight rod or rack.

To this end my invention consists in a duplex cutter having a cutting surface on the inner edge of the bifurcations adapted to form the outer part of a tooth of a cutting edge on the outer faces of the bifurcations that is adapted to form the base of the teeth in cutting a circular gear, and it also consists in the details of the several parts making up the cutting tool as a whole as more particularly hereinafter described and pointed out in the claims.

Referring to the drawings:—Figure 1 is a detail top view of a cutter embodying my invention. Fig. 2 is a detail front view of the cutter. Fig. 3 is a detail plan view on enlarged scale illustrating the method of using the cutter in forming a tooth on a gear wheel.

In the accompanying drawings the letter $a$ denotes the gear cutter that comprises a shank or body part $a'$ adapted to be secured in any suitable tool or cutter holder, and the cutting end $a^2$ on which is formed a plural number of cutters $b, c$. This cutting end is preferably bifurcated as shown in the drawings, the adjacent faces of the cutters $b\,c$ being shaped so that they form the outline of a given tooth $d$ as to that portion of the tooth lying outside of a pitch line $e$ (shown in the dotted outline in Fig. 3 of the drawings). It is not essential that all of the surface beyond the pitch line should be formed by such cutters or that the extent of the cut should be gaged by the location of the pitch line, but it is preferred to so form the cutter as to cut the portion of the tooth described.

On the outer edges of the outside branches $b\,c$ of the cutter the edge is so shaped as to form the base of each tooth from that point $l$ to which the tooth has been properly shaped by the inner surface of the cutter and continue it in the proper outline to the bottom of the tooth.

As a matter of fact in the operation of this duplex cutter the article on which the tooth is to be cut, as a gear wheel $f$, is held in position while the cutter $a$ operates to form a tooth $d$ to shape but in forming the outer end of a tooth between the adjacent faces of the branches $b$ and $c$ of the cutter the outer ends $b'$ and $c'$ of each branch of the cutter operates to cut away and form to shape the bases of the teeth $d'$ and $d^2$ respectively which are the teeth next adjacent to the tooth $d$ that is being shaped as to its outer portion between the branches of the cutter. If the gear is being moved in successive steps in the direction indicated by the arrow in the operation of cutting the teeth then the front base of a tooth $d'$ will be cut to shape at its base before its outer surface is formed and after the tooth has been formed as to its outer surface by being moved to a position where it will be shaped between the branches of the cutter it is not properly shaped at the base until it has been moved to the next position and in position to be operated upon by the part $c'$ of the branch $c$.

This duplex cutter operates to form in part three separate teeth in a single cut; it forms the outer part of a tooth, as $d$, between the bifurcations and works on the bases of the two next adjacent teeth at the same time with the result that a tooth from whatever formula the tooth may have been laid out is so made that a gear may be produced having teeth of a given pitch so that gear wheels of a considerable difference in diameter will run together in a train either with each other or can be used with a rack cut by the same cutter.

It is not essential to the embodiment of my invention in a cutter that the branches should be formed on a single piece of metal, as it is obvious that the same result may be obtained whether such branches are formed integral of the cutter body, or the whole shall be made up of separate cutter bodies placed side by side and comprising in the tool when in use the branching cutter arms.

I claim as my invention:—

1. In an improved duplex gear cutter, the branched cutters having the approximate inside surfaces and the outside surfaces formed duplicates of each other respectively and provided with cutting edges whereby the outer end only of a given tooth and the base only of each adjacent tooth are formed at one operation, all substantially as described.

2. In a duplex gear cutter having the cutter branches with the inside approximate surfaces and the outside surfaces formed duplicates of each other respectively and each provided with cutting edges whereby the outer surface only of a given tooth and the under cut base only of each adjacent tooth are formed to shape at one operation, all substantially as described.

3. In a gear cutter comprising a plural number of branches the inside approximate surfaces and the outside surfaces of which are respectively duplicates of each other and provided with cutting edges whereby the outer end only of certain teeth and the under cut bases of each adjacent tooth are formed at one operation, all substantially as described.

ROGER M. CLOUGH.

Witnesses:
CHAS. L. BURDETT,
A. B. JENKINS.